United States Patent [19]

Negishi

[11] 3,789,139

[45] Jan. 29, 1974

[54] SYSTEM FOR RECORDING AND REPRODUCING DIGITAL SIGNALS

[75] Inventor: Kazuo Negishi, Yokohama, Japan

[73] Assignee: Victor Company of Japan, Ltd., Yokohama-City, Kanagawa-ken, Japan

[22] Filed: Oct. 3, 1972

[21] Appl. No.: 294,539

[30] Foreign Application Priority Data

Oct. 4, 1971 Japan ................................ 46/77704
Oct. 4, 1971 Japan ................................ 46/77705

[52] U.S. Cl. ....... 178/6.6 A, 178/6.6 P, 179/15 BY, 179/100.2 MD, 340/174.1 G, 340/174.1 H

[51] Int. Cl. ...... G11b 5/06, G11b 27/30, H04n 5/78

[58] Field of Search ....... 178/6.6 A, 6.6 P, DIG. 23; 340/174.1 G, 174.1 H; 179/100.2 MD, 15 BY

[56] References Cited

UNITED STATES PATENTS 3,711,843 1/1973 Galvagni ...................... 340/174.1 H
3,720,933 3/1973 Schulein ........................ 179/15 BY
3,732,364 5/1973 Terada ......................... 340/174.1 G

*Primary Examiner*—Howard W. Britton
*Attorney, Agent, or Firm*—Louis Bernat

[57] ABSTRACT

A digital signal recording system carries out the operational steps of gating respectively sawtooth waves in response to two digital signals of a pulse train of constant period and data pulses constituted by the presence or absence of pulses in accordance with data, mixing the sawtooth waves thus gated, and recording the waves thus mixed as a composite sawtooth wave on a recording medium. The positions of rise and fall of the composite sawtooth wave respectively correspond to the above mentioned two digital signals. A digital signal reproducing system carries out the steps of reproducing signals recorded by the above described recording system, separating the pulses of constant perios and the data pulses through the utilization of the characteristics of the signal pulses thus reproduced, and deriving two digital signals.

8 Claims, 8 Drawing Figures

SYSTEM FOR RECORDING AND REPRODUCING DIGITAL SIGNALS

BACKGROUND OF THE INVENTION

The present invention relates to a system for recording and reproducing digital signals and more particularly to a system for recording on and reproducing from a single track on a recording medium digital signals having an informational content together with a synchronizing signal.

The magnetic tape of a video signal recording and reproducing apparatus (a so-called VTR) for home use and other uses, in general, has track patterns of three kinds, namely, a track for video signals, a track for audio signals, and a track for control signals. When one more data signal such as an addressing signal or queing signal is to be recorded on this magnetic tape, an additional kind of track must be provided thereon. However, the addition of one more track to the above mentioned stadard track pattern gives rise to a dimensional limitation in the formation of the other track patterns, and these other track patterns must unavoidably be changed. Consequently; the VTR apparatus must be changed in design. Furthermore, such a magnetic tape would not be interchangeable with one having the above mentioned stadard track pattern.

Accordingly, there is a need for a recording and reproducing system wherein, in addition to a video signal, an audio signal, and a control signal, one more data signal can be recorded in superposed state in an already existing track of the recording medium without a further increase in the number of tracks.

SUMMARY OF THE INVENTION

Accordingly, it is a general object of the present invention to provide a new and effective digital signal recording and reproducing system capable of fulfilling the above stated need.

Another object of the invention is to provide a system for recording and reproducing data signals made up of digital signals together with control signals of a constant period on and from a track for the control signals. In accordance with this system, there is no necessity of providing a track for exclusive use for data signals.

Still another object of the invention is to provide a system for recording and reproducing digital signals in a manner whereby reading of data can be carried out accurately and positively when, at the time of reproduction, the recording medium is caused to travel not only in the forward direction as that for recording but also in the reverse direction, and, moreover, even when there are variations in the speed of travel.

Other objects and further features of the invention will be apparent from the following detailed description when read in conjunction with the accompanying drawings.

DETAILED DESCRIPTION OF THE INVENTION

Figure 1:
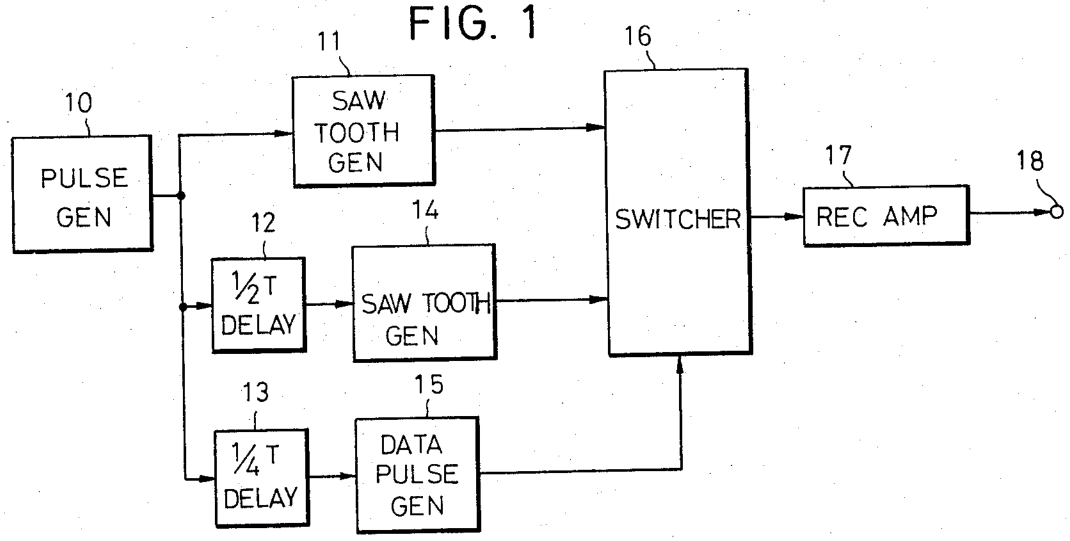
FIG. 1 is a schematic block diagram indicating the principle and the general organization of the recording system in a digital signal recording and reproducing system according to the present invention.

The principle and essential organization of the recording system in a digital signal recording and reproducing system according to the invention will be first described with reference to FIG. 1.

A pulse generator 10 generates a repeated pulse train with a constant period T. This pulse train is supplied as it is, on one hand, to a sawtooth generator 11, which produces, as its output, a first sawtooth wave of the same phase as the repeated pulse train of the period T. On the other hand, the output pulse train of the pulse generator 10 is delayed by ½ period by a ½ T delay circuit 12 and then supplied to a sawtooth generator 14 of reverse polarity. As the output of this sawtooth generator 14, there is obtained a second sawtooth wave which is of reverse polarity relative the first sawtooth wave and, moreover, is delayed by ½ period. These first and second sawtooth waves, which are the outputs of the sawtooth generators 11 and 14 are supplied to a switcher 16.

Furthermore, the pulse train from the pulse generator 10 is supplied to a ¼ T delay circuit 13, where it is delayed by ¼ period and then supplied to a data-pulse generator 15. In this data-pulse generator 15, a data pulse is composed of the pulse train delayed by ¼ period and of a digital signal having a coded informational content. The data pulse thus formed is supplied to the above mentioned switcher 16.

The first and second sawtooth waves from the sawtooth generators 11 and 14 are subjected to switching in the switcher 16 by the data pulses from the data-pulse generator 15 in accordance with the data content thereof and rendered into a single, continuous, composite sawtooth wave. The output signal thus subjected to switching from the switcher 16 is supplied to a recording amplifier 17, and the resulting amplified signal is led out through a terminal 18 and supplied to a recording head, whereby this signal is recorded in the control track on a magnetic tape.

Figure 2:
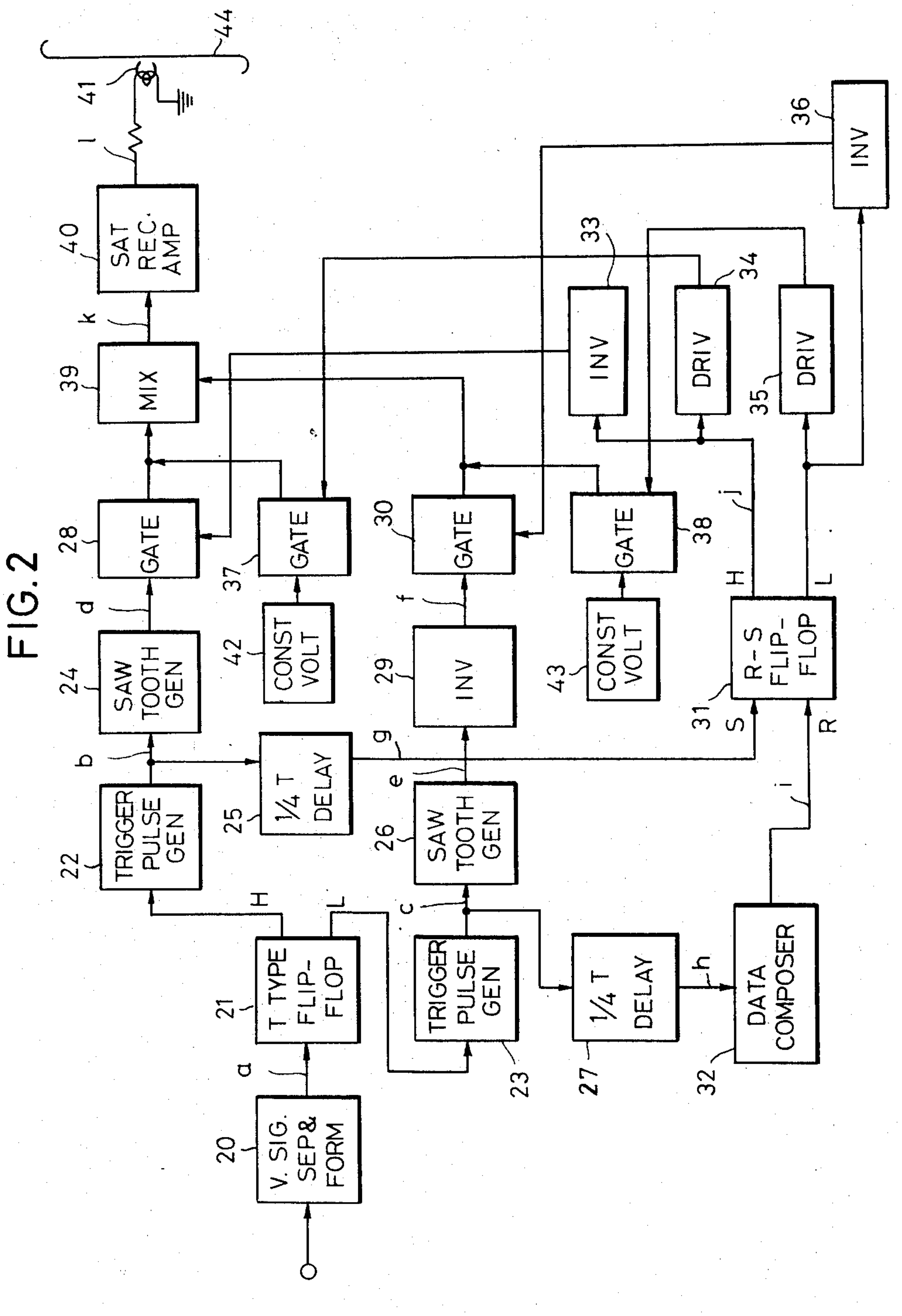
FIG. 2 is a schematic block diagram showing a specific embodiment of the recording system illustrated in FIG. 1.

FIG. 2 is a more detailed scehamtic block diagram showing an embodiment of the above described recording system, and FIGS. 3(A) through 3(L) are signal waveforms at various points in the system.

Referring to FIG. 2, a vertical synchronizing signal separator and wave-former 20 derives a 60Hz vertical synchronizing signal *a* as shown in FIG. 3(A) from a video signal applied thereto. The vertical synchronizing signal is fed to a T type flip-flop circuit 21 for conversion therein to a 30Hz signal, or a signal of one-half the previous frequency. H and L outputs derived respectively from the H and L terminals of the flip-flop circuit 21 are respectively fed to trigger pulse generators 22 and 23 and differentiated therein. Pulses *b* and *c* as shown in FIGS. 3(B) and 3(C) are derived respectively from the outputs of the trigger pulse generators 22 and 23. Assuming that the period of the 30 Hz signal is T, the differentiated pulses *b* and *c* are staggered in phase by ½ T from each other.

The output pulses *b* from the trigger pulse generator 22 are fed to a synchronized type sawtooth generator 24 for synchronization and, at the same time, to a ¼ delayed pulse generator 25 to cause them to be delayed by ¼ T. A sawtooth wave *d* shown in FIG. 3(D) is obtained at the output of the synchronized type sawtooth generator 24, while pulses *g* which have been delayed by ¼ period from the pulses *b* as shown in FIG. 3(G) are obtained at the output of the ¼ T delayed pulse generator 25. Likewise, the output of the trigger pulse generator 23 is also fed to the synchronized type sawtooth generator 26 to cause it to synchronize and, at the same time, to the ¼ T delayed pulse generator 27 to cause the output to be delayed by ¼ period. A sawtooth wave *e* as shown in FIG. 3(E) is obtained at the output of the synchronized type sawtooth generator 26, while pulses *h* as shown in FIG. 3(H) which have been delayed ¼ period from the pulses *c* are obtained at the output of the ¼ T delayed pulse generator 27.

The output sawtooth wave *d* from the synchronized type sawtooth generator 24 is fed to a gate circuit 28. On the other hand, an output sawtooth wave *e* from the synchronized sawtooth generator 26 undergoes polarity inversion by an inverter 29 to become a sawtooth wave *f* as shown in FIG. 3(F) before it is applied to a gate circuit 30.

The output pulses *g* from the above mentioned ¼ T delayed pulse generator 25 are fed to a set input terminal S of an R–S flip-flop circuit 31. On the other hand, output pulses *h* from the ¼ T delayed pulse generator 27 are fed to a data composer 32. Digital data due to a binary number, such as . . . 010110 . . . , have been stored in the data composer 32. At a timer position corresponding to data "1" in an input pulse train *h*, the data composer 32 develops a pulse but it develops no pulse at a time position corresponding to data "0". Therefore, pulses *i* as shown in FIG. 3(I) corresponding to the data are derived from the output of the data composer 32. These pulses *i* shown in FIG. 3(I) are applied to a rest input terminal R of the R–S flip-flop circuit 31.

When the flip-flop 31 is set by a pulse *g* and reset by a pulse *i*, a signal *j* of a waveform as shown in FIG. 3(J) is derived from the H output terminal of the flip-flop 31. The H output signal *j* is fed to the gate circuit 28 after polarity inversion by the inverter 33 on one hand and fed to a gate circuit 37 after being amplified by a drivier circuit 34 on the other. An L output signal derived from an L output terminal of the flip-flop 31 circuit is fed to a gate circuit 30 after it has been phase-inverted by an inverter 36 on one hand and is fed to a gate circuit 38 after it has been amplified by a driver circuit 35 on the other.

The gate circuit 28 gates the sawtooth wave *d* by using the output of the inverter 33, while the gate circuit 30 gates the sawtooth wave *f* by using the output of the inverter 36. Therefore, the sawtooth waves *d* and *f* are switchably gated respectively at the gate circuits 28 and 30 according to the data. On the other hand, the gate circuit 37 gates the voltage of a constant-voltage source 42 by using the output of the driver 34, and the gate circuit 38 gates the voltage of a constant-voltage source 43 by using the output of the driver 35. The outputs of the gate circuits 37 and 38 are respectively added to the outputs of the gate circuits 28 and 30, thereby compensating for the voltage difference when the sawtooth waves *d* and *f* are gated and stabilizing the outputs of the gate circuits 28 and 30. The stabilized gate outputs are applied to a mixer 39 for combining the outputs.

The waveform of each signal furnished to the mixer 39 will be considered. An input signal waveform *f* to the mixer 39 is cut off at the falling edge of the H output signal wave form *j* of the flip-flop circuit 31, with the result that an input signal of a waveform *d* is applied to the mixer 39. Further, the input of the waveform *d* to the mixer 39 is cut off at the rising edge of the waveform *j*, and an input of the waveform *f* is applied to the mixer 39. Thus, a signal of a composite sawtooth waveform *k* due to switching by the waveform *j* and mixing of the waveforms *f* and *d* is derived from the output of the mixer 39 as indicated in FIG. 3(K).

Since the signal of the composite sawtooth waveform *k* will still produce, as it is, noise in the switching section, it is fed to a saturation type recording amplifier 40. A signal of the waveform *k* is saturated by the amplifier 40 as shown in FIG. 3(L), whereby a waveform *l* produced by slicing the top and bottom portions of waveform *k* can be derived. The signal of this waveform *l* represents a synchronizing signal with a period T at the rising edge and data . . . 010110 . . . at the falling edge. The signal of the waveform *l* is recorded on a control track on a magnetic tape 44.

Figure 3:
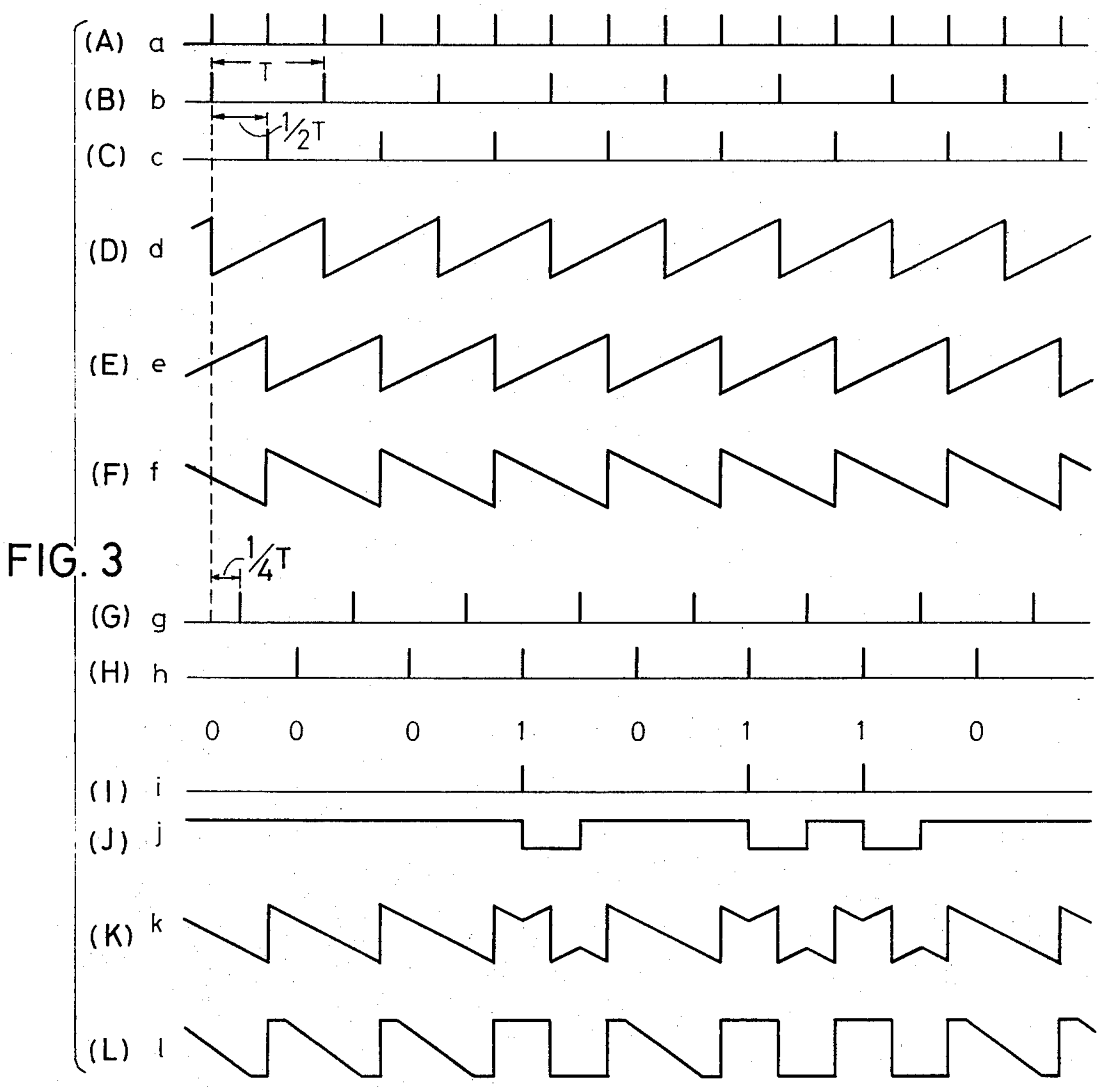
FIGS. 3(A) through 3(L) are pulse time charts showing waveforms of signals respectively at various parts of the recording system shown by block diagram in FIG. 2.
Figure 4:
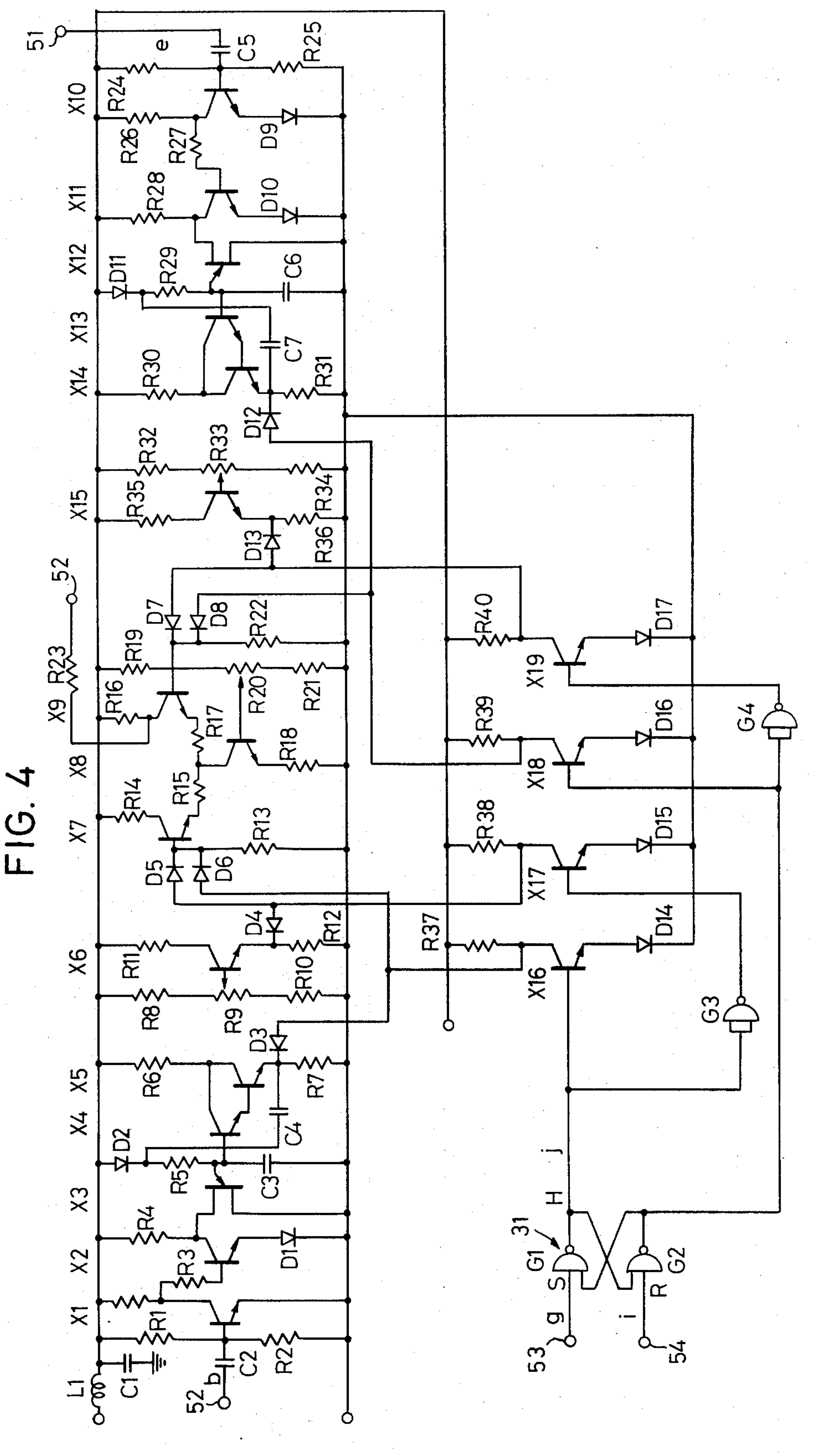
FIG. 4 is a circuit diagram showing one embodiment of a specific electrical circuit of the system illustrated by schematic block diagram in FIG. 2.

FIG. 4 is a circuit diagram illustrating one embodiment of a specific electrical circuit of a recording system based on the schematic block diagram shown in FIG. 3.

The circuit including transistors X1 through X5 constitutes the synchronized sawtooth generator 24, and the output trigger pulse from the trigger pulse generator 22 is applied to the base of the transistor X1 from the input terminal 50. The circuit including transistors X10 through X14 constitutes the synchronized type sawtooth generator 26, and the output trigger pulse from the trigger pulse generator 23 is applied to the base of the transistor X10 through an input terminal 51. Transistors X7 through X9 constitute the inverter 29, the mixer 39, and the recording amplifier 40, respectively. A recording signal is derived from the collector of the transistor X9 through a resistor R23 and is fed to a recording magnetic head 41 through an output terminal 52. Transistors X6 and X15 respectively constitute the constant-voltage sources 42 and 43.

Two NAND gates G1 and G2 to which signals from the ¼ T delayed pulse generator 25 and the data composer 32 are supplied through terminals 53 and 54 constitute the R–S flip-flop circuit 31. Transistors X16 and X18, whose bases are respectively connected to the H and L output terminals of the flip-flop 31, constitute respectively the inverters 33 and 36. A gate G3 connected to the H output terminal of the flip-flop circuit 31 and a transistor X17 whose base is connected to the gate G3 constitute the driver circuit 34. A gate G4 connected to the L output terminal of the flip-flop circuit 31 and a transistor X19 whose base is connected to the gate G4 constitute the driver circuit 35. Further, the gate circuits 28, 37, 38 and 30 are respectively composed of diodes D3 and D6, D4 and D5, D7 and D13, and D8 and D12.

The constants of the circuit elements in the above described circuit are as follows.

Resistors

| | | | |
|---|---|---|---|
| R1 | 33 KΩ | R16 | 1.5 KΩ |
| R2 | 100 KΩ | R17 | 150 ΩKΩ |
| R3 | 10 KΩ | R18 | 100 Ω |
| R4 | 3.9 KΩ | R19 | 18 KΩ |
| R5 | 220 KΩ | R20 | 4.7 KΩ |
| R6 | 680 Ω | R21 | 330 Ω |
| R7 | 680 Ω | R22 | 4.7 KΩ |
| R8 | 3.9 KΩ | R23 | 1.5 KΩ |
| R9 | 1 KΩ | R24 | 33 KΩ |
| R10 | 1.8 KΩ | R25 | 100 KΩ |
| R11 | 2.2 KΩ | R26 | 3.9 KΩ |
| R12 | 680 Ω | R27 | 10 KΩ |
| R13 | 4.7 KΩ | R28 | 3.9 KΩ |
| R14 | 1.5 KΩ | R29 | 220 KΩ |
| R15 | 150 Ω | R30 | 680 Ω |
| R31 | 680 Ω | R36 | 680 Ω |
| R32 | 3.9 KΩ | R37 | 6.8 KΩ |
| R33 | 1 KΩ | R38 | 6.8 KΩ |
| R34 | 1.5 KΩ | R39 | 6.8 KΩ |
| R35 | 2.2 KΩ | R40 | 6.8 KΩ |

Capacitors

| | | | |
|---|---|---|---|
| C1 | 4 μF | C5 | 0.001 μF |
| C2 | 0.001 μF | C6 | 0.33 μF |
| C3 | 0.33 μF | C7 | 2 μF |
| C4 | 2 μF | | |

The reproducing system according to this invention will now be described.

Figure 5:
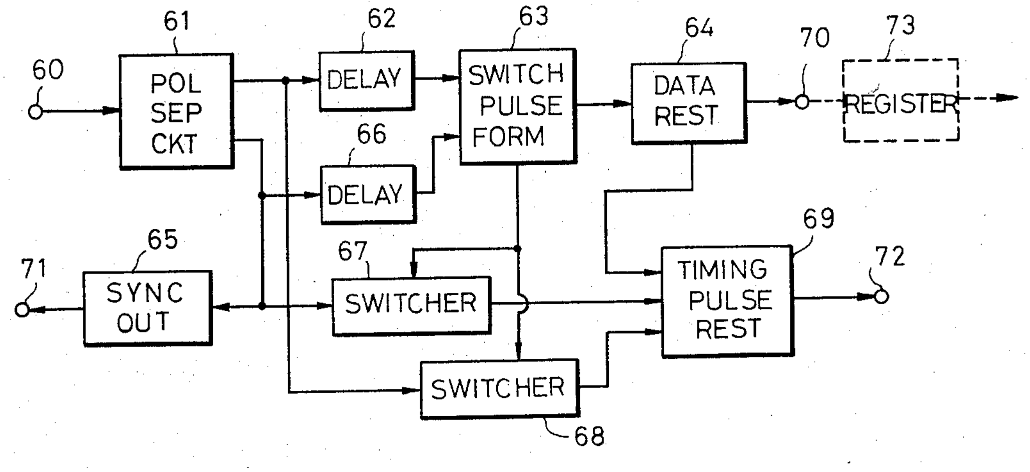
FIG. 5 is a schematic block diagram indicating the principle and general organization of the reproducing system in a digital signal recording and reproducing system according to the invention.

Referring to FIG. 5 which is a schematic block diagram indicating the principles of the reproducing system, the composite sawtooth waveform signal which has been recorded on a control track on the magnetic tape 44 by the recording magnetic head 41 is reproduced by a reproducing head in the reproducing system, and, in this case, the rising and falling edges of the composite sawtooth wave are differentiated by the reproducing head. The differentiated pulse is fed to a polarity separation circuit 61 through an input terminal 60. This reproduced pulse signal is polarity-separated by the polarity separation circuit 61 and restored to the data pulse and the synchronizing signal.

The data pulse from the polarity separation circuit 61 is supplied by way of a delay circuit 62 and a switching pulse former 63 to a data restorer 64 and derived as data from an output terminal 70.

The synchronizing signal from the polarity separation circuit 61 is derived from a terminal 71 through a synchronising signal output circuit 65 on one hand and is fed to a delay circuit 66 and a switcher 67 on the other. The synchronizing signal passed through the delay circuit 66 is fed to the switching pulse former 63. The resulting output switching pulse from the switching pulse former 63 is fed to the switcher 67 or 68 for switching between a synchronizing signal and data delivered from the polarity separation circuit 61. The signal whose data position has been sampled by the switchers 67 and 68 is fed to a timing pulse restorer 69 together with data delivered from the data restorer 64. Thus, a clock pulse existing at the data time position can be derived from the output terminal 72 of the timing pulse restorer 69.

Figure 6:
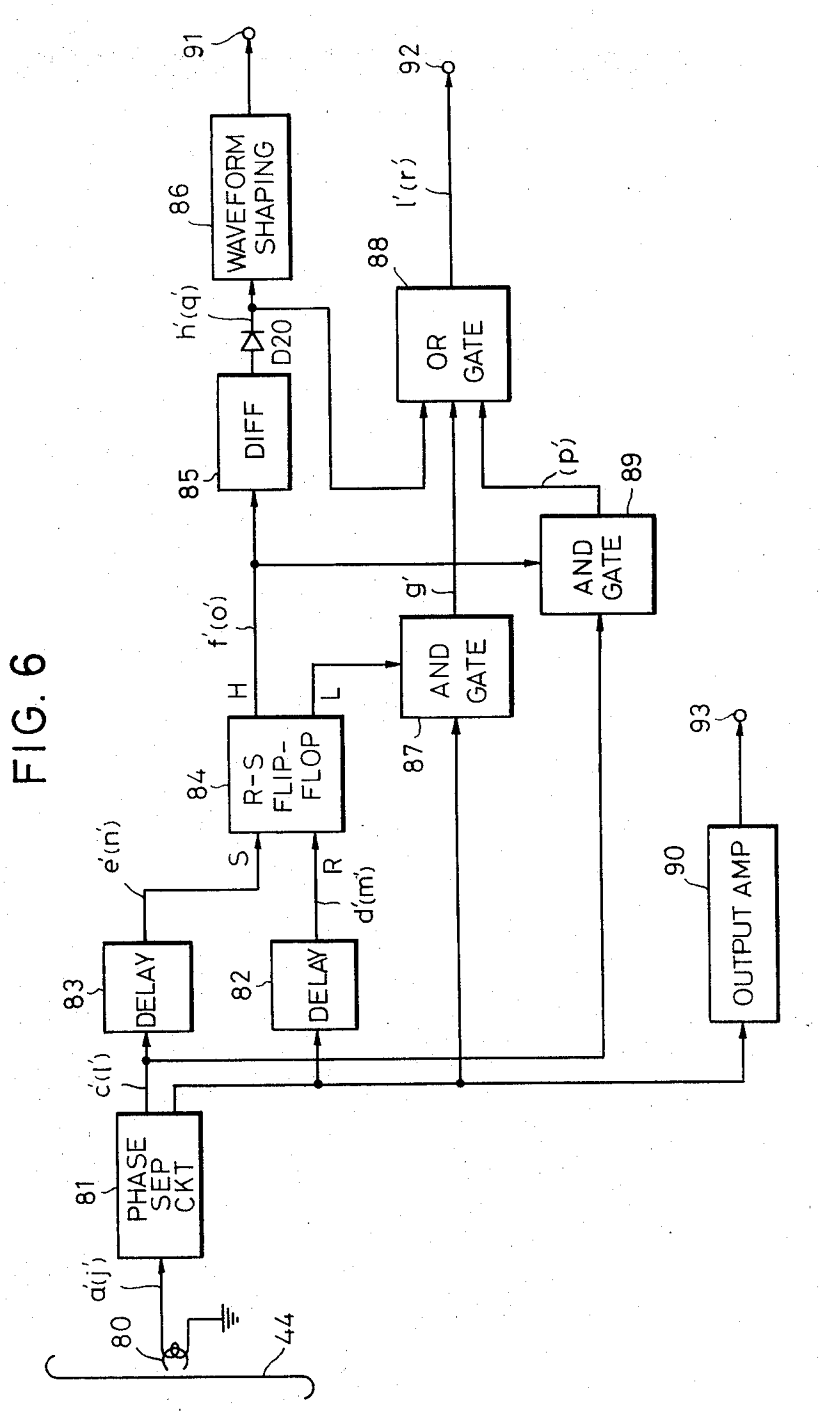
FIG. 6 is a schematic block diagram of one embodiment of the reproducing system illustrated in FIG. 5.
Figure 7:
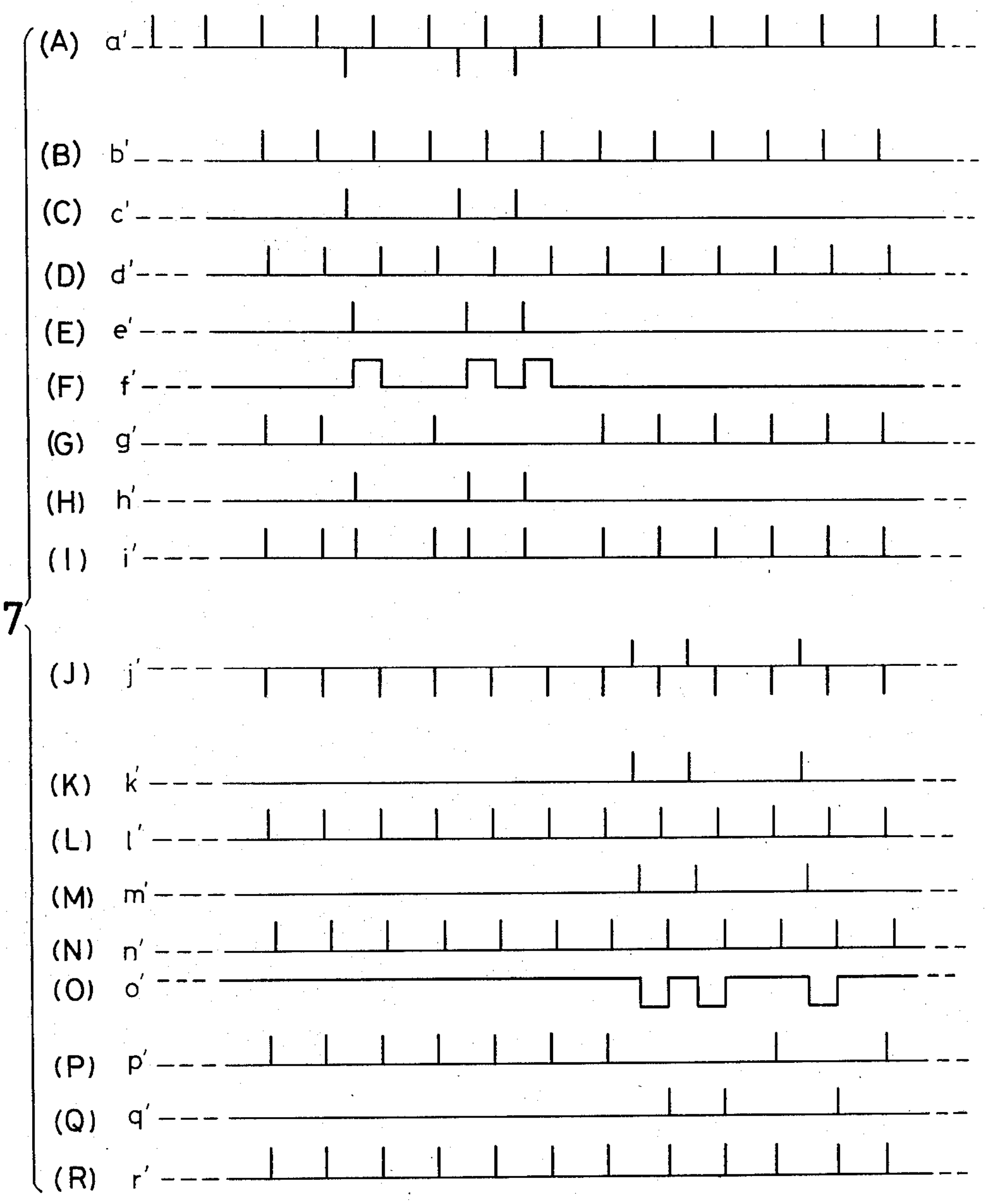
FIGS. 7(A) through 7(R) are pulse time charts showing waveforms of signals respectively at various parts of the recording system shown by block diagram in FIG. 6.

FIG. 6 is a further detailed schematic block diagram of the foregoing embodiment of the reproducing system while FIGS. 7(A) through 7(R) illustrate signal waveforms at various points in the diagram.

Referring to FIG. 6, the case where the magnetic tape 44 is caused to run in the same direction as in recording (either synchronous or variable-speed running will do) will be considered. On reproducing a composite sawtooth wave that has been recorded on a recording medium by a reproducing magnetic head 80 as a signal of waveform *l* as shown in FIG. 3(L), a pulse train *a'* as shown in FIG. 7(A) is derived from the reproducing magnetic head 80. This pulse train *a'* is fed to a phase separation circuit 81. Since the pulse train *a'* consists of synchronizing pulses of positive polarity and data pulses of negative polarity, it is phase-separated in the phase separation circuit 81 and a synchronizing pulse train *b'* as shown in FIG. 7(B) and a data pulse train *c'* as shown in FIG. 7(C) are separately derived on the output side of the phase separation circuit 81.

The synchronizing pulses *b'* are fed to the reset input terminal R of an R–S flip-flop circuit 84 via a delay circuit 82, while the output data pulses *c'* from the phase separator 81 are fed to the set input terminal S of the flip-flop circuit 84 via a delay circuit 83.

The output pulses from the delay circuits 82 and 83 are, as shown respectively in FIGS. 7(D) and 7(E), pulses *d'* and *e'* which have been delayed more than their pulse width from the pulses *b'* and *c'*. The L and H terminal outputs from the flip-flop circuit 84 are respectively fed to AND gates 87 and 89 as gating signals.

A signal derived from the H output terminal of the flip-flop circuit 84 is a rectangular pulse *f'* rising at pulse *e'* and falling at pulse *d'* as shown in FIG. 7(F). The signal of the rectangular waveform *f'* is fed to a differentiating circuit 85 and differentiated. Of the differentiated pulses, only those of positive polarity pass through a diode D20, and data pulses *h'* including the same data . . . 010110 . . . as in recording can be derived as shown in FIG. 7(H). These data pulse *h'* are shaped by a waveform shaping circuit 86 before they are taken from the output terminal 91.

A signal of a waveform corresponding to the phase-inverted rectangular waveform *f'* is derived from the L terminal of the flip-flop circuit 84, and this signal is fed to an AND gate 87 to make an AND gate the synchronizing pulses *b'* furnished from the phase separator 81. Accordingly, pulses *g'* as shown in FIG. 7(G) are derived from the output of the AND gate 87. These pulses *g' l* are formed from the pulses sampled from the synchronizing pulses *b'* within the widths of the output waveform from the L terminal of the flip-flop circuit 84 corresponding to an inverted waveform of the rectangular waveform *f'*.

These pulses *g'* are fed to an OR gate 88 to be OR gated with the data pulses *h'* furnished from the differential circuit 85 and the diode D20. Thus a pulse train *i'*, as shown in FIG. 7(I) is derived from the output of the OR gate 88. The pulse train *i'* comprises clock pulses of the same frequency as the synchronizing signal having pulses in the data pulse positions. The clock pulses *i'* are derived from the terminal 92 and used for reading out the data from the data pulses.

The synchronizing pulses *b'* from the phase separation circuit 81 are fed to a synchronizing signal output amplifier 90 to undergo amplification before they are derived from the terminal 93. The amplified pulses are used for a synchronizing control signal for driving the reproducing system in synchronism with the recording period of the recording system.

The case where the magnetic tape 44 is driven in the direction opposite to the running direction in recording will now be described.

A signal reproduced by a reproducing magnetic head 80 becomes pulse signals $j'$ as shown in FIG. 7(J). As compared to the pulse signals $a'$, the reproduced pulse signal $j'$ is opposite in polarity, and the sequency of pulse reproduction (readout) is reversed as shown in FIG. 7(J). Thus, pulses $k'$ as shown in FIG. 7(K) are fed from the output of the phase separator 81 to the delay circuit 82 and the AND gate 87, while pulses $l'$ as shown in FIG. 7(L) are fed from the output of the phase separator 81 to the delay circuit 83 and the AND gate 89.

The pulses $k'$ and $l'$ are respectively delayed by the delay circuits 82 and 83 by an amount in excess of their pulse width and fed to the reset and set terminals R and S of the R-S flip-flop circuit 84 as delayed pulses $m'$ and $n'$ as shown in FIGS. 7(M) and 7(N). A signal $o'$ of the waveform shown at FIG 7(O) is derived from the H output terminal of the flip-flop circuit 84, and the signal $o'$ is fed to the differentiation circuit 85 and, at the same time, to the AND gate 89. The pulses $l'$ are AND gated with the waveform $o'$ in the AND gate 89, and its output pulse signal $p'$ as shown in FIG. 7(P) is fed to an OR gate 88. Since the output of the L terminal of the flip-flop circuit 84 has a waveform of opposite polarity relative to the wave form $o'$, there is no output pulse at the output terminal of the AND gate 87 which is supplied with pulses $k'$ and the L terminal output.

The output signal $o'$ of the flip-flop circuit 84 is differentiated at the differentiation circuit 85. Out of the differentiated pulses, the pulses of positive polarity is taken out by the diode D20. Pulses $q'$ (which exist at positions corresponding the rising positions of the signal $o'$) as shown in FIG. 7(Q) are fed to the waveform shaping circuit 86 and OR GATE 88.

The pulses $q'$ contain data . . . 11010 . . . , or data opposite to the data in the case of recording. These pulses $q'$ are shaped by the waveform shaping circuit 86 and derived from the terminal 91 as data. Since the data pulses are reverse in the sequence to the data pulses in recording, the data pulses derived from the terminal 91 need to be stored once in a register 73 (FIG. 5) and to be sent out in the reverse direction as . . . 010110 . . . .

On the other hand, the pulses $p'$ and $q'$ fed to the OR gate 88 are OR gated with each other and clock pulses $r'$ as shown in FIG. 7(R) are derived from the OR gate 88. The clock pulses $r'$ are obtained from the terminal 92.

Figure 8:
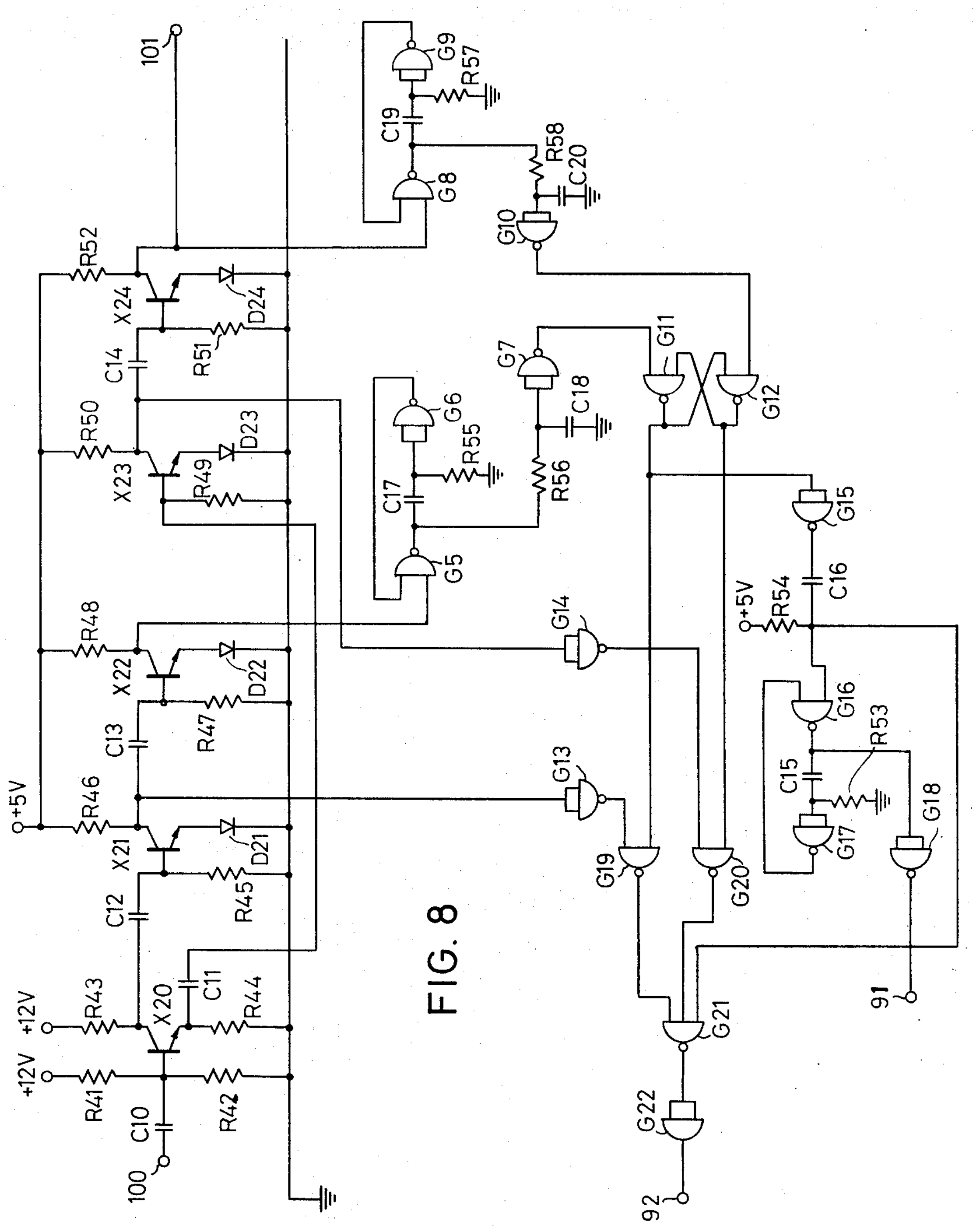
FIG. 8 is a cricuit diagram showing one embodiment of a specific electrical circuit of the system illustrated by scehmatic block diagram in FIG. 6.

An actual electrical circuit of an embodiment of a reproducing system based on the foregoing schematic block diagram is shown in FIG. 8.

The circuit including transistors X20 through X24 constitutes the phase separation circuit 81 and a reproduced signal that has been reproduced by the reproducing magnetic head 80 and amplified by a preamplifier is applied to the base of the transistor X20 through an input terminal 100.

The circuit including the gates G5, G6 and G7, resistors R55 and R56, and capacitors C17 and C18, the circuit including the gates G8, G9 and G10, resistors R57 and R58, and capacitors C19 and C20, and the circuit including two NAND gates G11 and G12 constitute respectively the delay circuit 83, the delay circuit 82, and the flip-flop circuit 84. Gates G19 and G20 constitute respectively AND gates G89 and G87, and signals passing through gates G13 and G14 which are derived from the collectors of the transistors X21 and X23 in the phase separator 81 are gated by the output of the flip-flop circuit 84.

Gate 21 constitutes an OR gate. The circuit containing the gate G15, the capacitor C16, and the resistor R54 constitutes a differentiation circuit 85, while gates G16 and G17, resistor R53, and capacitor C15 constitute, in combination, the waveform shaping circuit 86. Data pulses are derived through a gate G18 while clock pulses are derived through a gate G22. Further, a signal derived from the collector of the transistor X24 in the phase separator 81 is fed to the synchronizing signal output amplifier 90 through an output terminal 101.

The constants of the circuit elements in the above described circuit are as follows.

Resistors

| | | | |
|---|---|---|---|
| R41 | 47 KΩ | R50 | 1.5 KΩ |
| R42 | 3.3 KΩ | R51 | 10 KΩ |
| R43 | 680 Ω | R52 | 1.5 KΩ |
| R44 | 680 Ω | R53 | 1 KΩ |
| R45 | 10 KΩ | R54 | 10 KΩ |
| R46 | 1.5 KΩ | R55 | 1 KΩ |
| R47 | 10 KΩ | R56 | 100 Ω |
| R48 | 1.5 KΩ | R57 | 1 KΩ |
| R49 | 10 KΩ | R58 | 100 Ω |

Capacitors

| | | | |
|---|---|---|---|
| C10 | 0.01 μF | C15 | 0.047 μF |
| C11 | 1/15 μF | C16 | 0.01 μF |
| C12 | 1/15 μF | C17 | 0.027 μF |
| C13 | 0.01 μF | C18 | 0.001 μF |
| C14 | 0.01 μF | C19 | 0.027 μF |
| | | C20 | 0.001 μF |

In cases where a signal recorded by the previously mentioned recording system is reproduced by a conventional reproducing system without using the above-mentioned reproducing system, readout of the data signal cannot be performed, but readout of the 30 Hz signal with constant period is possible and can be used for synchronous driving.

Further, this invention is not limited to these embodiments but various variations and modifications may be made without departing from the scope and spirit of the invention.

What I claim is:

1. A digital signal recording system comprising:
pulse train supplying means for supplying a repetitive pulse train of a constant period;
means for generating a first sawtooth wave of a phase and frequency coincident with those of said pulse train thus supplied;
means for generating a second sawtooth wave delayed by ½ of said period from said pulse train thus supplied and having the opposite polarity relative to said first sawtooth wave;
means for generating a data pulse train digitally coded by the presence or absence of pulses in accordance with data with a pulse train delayed by ¼ period relative to said pulse train thus supplied as timing pulses;
means for causing switching of said first and second sawtooth waves by said data pulse train thereby to obtain a composite sawtooth wave; and means for recording said composite sawtooth wave as a recording digital signal in one track on a recording medium, said composite sawtooth wave having a rising part coinciding with the phase and frequency of the pulse train of said constant period and a falling part coinciding with the phase and period of said data pulse train and having the information content of two digital signals of the pulses of said constant period and said data pulses.

2. A digital signal recording system according to claim 1 in which said pulse train supplying means comprises means for separating vertical synchronizing signals from video signals and means for forming said pulse train of constant period from said separated vertical synchronizing signal.

3. A reproducing system for reproducing digital signals recorded by the recording system according to claim 1, said reproducing system comprising:

means for reproducing said comosite sawtooth wave recorded on said recording medium as pulses resulting from differentiation of the rising and falling parts thereof;

means for separating according to polarity pulses of a polarity corresponding to said rising part and pulses of a polarity corresponding to the falling part of the pulse train from said reproducing means and resulting in separating said data pulses and said pulses of constant period;

delay means for delaying said data pulses thus separated and said pulses of constant period;

means for forming pulses for switching from the resulting output pulses of said delay means;

means for obtaining pulses in accordance with data from said pulses for switching;

means for gating said data pulses separated respectively by said pulses for switching or said pulses of constant period;

means for forming timing pulses for use in restoring data from pulses in accordance with said data from pulses in accordance with said data and said data thus gated or pulses of constant period; and means for deriving as a control signal said pulses of constant period thus separated.

4. A digital signal reproducing system according to claim 3 which further comprises a register for receiving as input said pulses in accordance with data and sending the same out in the direction opposite to that of the input, said reproducing means reproducing said composite sawtooth wave from said recording medium driven to travel in the direction reverse to that at the time of recording and deriving pulses of negative polarity in correspondence with the rising part of said composite sawtooth wave and pulses of positive polarity in correspondence with the falling part thereof.

5. A digital signal recording system comprising:

pulse train supplying means for supplying a repetitive pulse train of a constant period interrelated with a vertical synchronizing signal of a video signal;

a first flip-flop circuit for generating an output of a waveform having rising and falling parts for each pulse of said pulse train thus supplied;

a first trigger pulse generator for differentiating the output waveform of said first flip-flop circuit and generating, at the rising part thereof, first trigger pulses of a frequency equal to ½ of that of said supplied pulses;

a second trigger pulse generator for differentiating the output waveform of said first flip-flop circuit and generating second trigger pulses lagging by ½ period relative to said first trigger pulses at the falling part thereof;

a first sawtooth generator operating in response to said first trigger pulses to generate a first sawtooth wave;

a second sawtooth generator for generating a second sawtooth wave in response to said second trigger pulses;

means for inverting the polarity of said second sawtooth wave;

means for forming a first delay pulse of a period delayed relative to said first trigger pulses by ¼ of the period thereof;

means for forming a second delay pulse of a period delayed relative to said second trigger pulses by ¼ of the period thereof;

means for determining the presence or absence of output pulses from the pulse train of said second delay pulses in accordance with the data content and generating binary-coded data pulses;

a second flip-flop circuit supplied with said first trigger pulses and said data pulses and respectively set and reset thereby to generate output rectangular waves;

first gate means for gating said first sawtooth wave through the use of one output rectangular wave of said second flip-flop circuit;

second gate means for gating said second sawtooth wave through the use of the other output rectangular wave of a polarity opposite that of said one output rectangular wave;

mixer means for mixing the sawtooth waves thus gated by said first and second gate means and obtaining one continuous composite sawtooth wave; and recording means for recording said composite sawtooth wave in one track on a recording medium.

6. A digital signal recording system according to claim 5 which further comprises a saturation-type recording amplifier means for accomplishing saturation amplification of the composite sawtooth wave obtained by said mixer means and supplying the resulting output signal to said recording means.

7. A digital signal recording system according to claim 5 which further comprises: a first constant-voltage source; third gate means for gating the voltage of said first constant-voltage source through the use of said one output rectangular wave of said second flip-flop circuit and adding the resulting output voltage to the output sawtooth wave of said first gate means; a second constant-voltage source; and fourth gate means for gating the voltage of said second constant-voltage source through the use of said other output rectangular wave of said second flip-flop circuit and adding the resulting output voltage to the output sawtooth wave of said second gate means.

8. A reproducing system for reproducing digital signals recorded by the recording system according to claim 5, said reproducing system comprising:

means for reproducing said composite sawtooth wave recorded on said recording medium as pulses resulting from differentiation of the rising and falling parts thereof;

means for separating by polarity pulses of positive polarity corresponding to said rising part and pulses of negative polarity corresponding to said falling part of the pulse train from said reproducing means and separating said pulse train of constant period and said data pulses;

first and second delay means for delaying said data pulses and said pulses of constant period thus separated respectively by at least the width of said pulses;

a third flip-flop circuit supplied respectively with output delay pulses of said first and second delay means, thereby being set and reset, and generating output rectangular waves;

means for differentiating one of the output rectangular waves of said third flip-flop circuit, deriving positive polarity pulses thereof, and obtaining pulses in accordance with data;

fifth gate means for gating said pulses of constant period through the use of the other output rectangular wave of a polarity opposite that of said one output rectangular wave of said third flip-flop circuit;

sixth gate means for gating said separated data pulses through the use of said one output rectangular wave of said third flip-flop circuit; and seventh gate means for forming clock pulses from said pulses in accordance with date and said fifth or sixth gate means.

* * * * *